United States Patent
Schein et al.

(10) Patent No.: US 9,104,450 B2
(45) Date of Patent: Aug. 11, 2015

(54) GRAPHICAL USER INTERFACE COMPONENT CLASSIFICATION

(75) Inventors: Sagi Schein, Haifa (IL); Omer Barkol, Haifa (IL); Ruth Bergman, Haifa (IL); Ayelet Pnueli, Haifa (IL); Michael Pogrebisky, Rishon Le Zion (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1690 days.

(21) Appl. No.: 12/605,418

(22) Filed: Oct. 26, 2009

(65) Prior Publication Data

US 2011/0099137 A1 Apr. 28, 2011

(51) Int. Cl.
| | |
|---|---|
| G06N 3/02 | (2006.01) |
| G06N 5/02 | (2006.01) |
| G06N 5/04 | (2006.01) |
| G06F 9/455 | (2006.01) |

(52) U.S. Cl.
CPC .............. *G06F 9/45512* (2013.01); *G06N 3/02* (2013.01); *G06N 5/02* (2013.01); *G06N 5/04* (2013.01)

(58) Field of Classification Search
None
See application file for complete search history.

(56) References Cited

U.S. PATENT DOCUMENTS

| | | | | |
|---|---|---|---|---|
| 5,899,999 | A * | 5/1999 | De Bonet | 1/1 |
| 6,157,736 | A | 12/2000 | Jodoin et al. | |
| 7,266,243 | B2 | 9/2007 | Dolan et al. | |
| 8,275,175 | B2 * | 9/2012 | Baltatu et al. | 382/118 |
| 2004/0001625 | A1 | 1/2004 | Curry et al. | |
| 2004/0175036 | A1 | 9/2004 | Graham | |
| 2005/0195221 | A1 | 9/2005 | Berger et al. | |
| 2005/0259871 | A1 | 11/2005 | Li et al. | |
| 2006/0072823 | A1 | 4/2006 | Maekawa | |
| 2006/0210158 | A1 | 9/2006 | Pekar et al. | |
| 2006/0236268 | A1 * | 10/2006 | Feigenbaum | 715/853 |
| 2009/0148039 | A1 | 6/2009 | Chen et al. | |

OTHER PUBLICATIONS

Paskalev, "Rule Based GUI Modification and Adaptation", Proceeding CompSysTech '09 Proceedings of the International Conference on Computer Systems and Technologies and Workshop for PhD Students in Computing Article No. 93, ACM New York, NY, USA, Jun. 2009, pp. VI.3-1-VI.3-7.*

Camara Chavez, Cord, Philipp-Foliguet, Precioso, Araujo, "Robust Scene Cut Detection by Supervised Learning", 14th European Signal Processing Conference from "http://www.eurasip.org/Proceedings/Eusipco/Eusipco2006/HTML/listAuthorTitles.html", Sep. 2006, pp. 1-5.*

Yang, Kpalma, Ronsin, "A Survey of Shape Feature Extraction Techniques" published in Pattern Recognition, Peng-Yeng Yin (Ed.), Intech, New York (2008) pp. 43-90 of 696.*

(Continued)

*Primary Examiner* — Kakali Chaki
*Assistant Examiner* — Walter Hanchak
(74) *Attorney, Agent, or Firm* — Kraguljac Law Group, LLC.

(57) ABSTRACT

Systems, methods, and other embodiments associated with graphical user interface (GUI) component classification are described. One example method includes generating a first vector. The first vector may be generated based on image data describing a GUI component. The example method may also include assigning a GUI component classifier to the GUI component. Assigning the GUI component classifier may comprise comparing the first vector to members of a vector set. Members of the vector set may describe GUI elements. The example method may also include providing the GUI component classifier.

20 Claims, 5 Drawing Sheets

(56) References Cited

OTHER PUBLICATIONS

Issam El-Naga, Yongyi Yang, Miles N. Wernick, Nikolas P. Galatsanos, and Robert M. Nishikawa, "A Support Vector Machine Approach for Detection of Microcalcifications", IEEE Trasnsactions on Medical Imaging, vol. 21, No. 12, Dec. 2003, pp. 1552-1563.*

Krystian Mikolajczyk and Cordelia Schmid, "A performance evaluation of local descriptors", IEEE Transactions on Pattern Analysis and Machine Intelligence, vol. 27, No. 10, Oct. 2005, pp. 1615-1630.*

Bastian Leibe, Krystian Mikolajczyk, Bernt Schiele, "Segmentation Based Multi-Cue Integration for Object Detection", Proceedings for The British Machine Vision Conference (BMVC), 2006, pp. 119.1-119.10.*

Lamberti, Sanna, "Extensible GUIs for Remote Application Control on Mobile Devices", IEEE Computer Graphics and Applications, IEEE, vol. 28, issue 4, Jul.-Aug. 2008, pp. 50-57.*

* cited by examiner

GRAPHICAL USER INTERFACE COMPONENT CLASSIFICATION

BACKGROUND

A graphical user interface (GUI) is one technology that allows a person to interact with an underlying application. However, it is sometimes beneficial to allow a process to interact with the GUI. The process may facilitate observing, manipulating, repurposing, and/or summarizing the application associated with the GUI. For example, a repurposing logic may be designed to modify a GUI of a website for mobile devices. In another example, a software testing logic may track and replay user inputs to a GUI. Logics that interact with GUIs sometimes associate a specific functionality to individual elements of a GUI. This may require that GUI components be classified into element types. However, it can sometimes be difficult for a logic to classify GUI components. Identifying how GUI components are related to other nearby GUI components adds another layer of complexity to this task.

Conventional GUI component classification techniques sometimes rely on information contained in a run time object hierarchy (e.g., a document object model (DOM)). However, in some cases an object hierarchy may not exist or may not contain useful information. For example, a FLASH® application in a webpage may contain multiple GUI components but the DOM for the website would classify the entirety of the FLASH® application as a single element. In another example, some Web 2.0 development toolkits may not adequately describe semantic information for some run-time objects. Thus, when hierarchy information is unavailable, conventional GUI classification tools may be unable to accurately label a GUI component.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Systems and methods associated with graphical user interface (GUI) component classification are described. One example method includes generating a feature vector based on image data describing a GUI component. Generating the vector primarily based on image data may function when run time information (e.g., hierarchy information, document object model (DOM) data) is unavailable or incomplete. The feature vector may be a condensed description of the GUI component. In one example, the feature vector may capture features that are invariant under object transformations relating to formatting (e.g., color modifications, font changes). The example method also includes assigning a GUI component classifier to the GUI component as a function of comparing the first vector to members of a vector set. The GUI component classifier may function as a label that states what type of GUI element is contained in a GUI component. Members of the vector set may describe GUI elements. Thus the GUI component classifier may identify a GUI element that the GUI component closely resembles.

In another embodiment, assigning the GUI component classifier includes a series of comparisons. For example, a small portion of the vector set may be selected using a low processing intensive calculation. This small portion may then be narrowed further into a smaller portion using a medium processing intensive calculation. The smaller portion may then be further refined into a set of likely matches using a high processing intensive calculation. While a series of eliminations are described, in another example, assigning the GUI component classifier may include comparing all features of vector generated from a GUI component to all features of members of the vector set. However, by eliminating unlikely matches using lower processing intensive calculations, the number of elements compared using higher processing intensive calculations may be reduced. This may facilitate faster and/or more accurate classification. In one example, the set of likely matches may include a single element. However, a person having ordinary skill in the art can see how it may be possible to use greater or fewer calculations and/or comparisons when classifying the GUI component. As used herein, the terms low processing intensive, medium processing intensive, and high processing intensive are intended to be relative to one another, and not an external metric.

A GUI component may comprise a GUI element that facilitates performing a task associated with a GUI. However, some GUI components may comprise multiple GUI elements. While systems and methods associated with classifying GUI components as a single element are described, a person having ordinary skill in the art can see how claimed techniques may also be applicable to classifying GUI components as a group of GUI elements. For example, a boilerplate website header may be a portion of a GUI for several web pages associated with different services performed by the same company. In some instances it may be appropriate to train a computer to classify and/or treat the boilerplate header as a single GUI element even though it may be made up of multiple individual elements.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DOM: Document Object Model
DVD: digital versatile disk and/or digital video disk.
GUI: Graphical User Interface
HTTP: hypertext transfer protocol.
LAN: local area network.
WAN: wide area network
PCI: peripheral component interconnect.
PCIE: PCI express.
RAM: random access memory.
DRAM: dynamic RAM.
SRAM: static RAM.
ROM: read only memory.
PROM: programmable ROM.
USB: universal serial bus.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other storage media from which a computer, a processor or other electronic device can read.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software stored on a computer-readable medium, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

Figure 1:
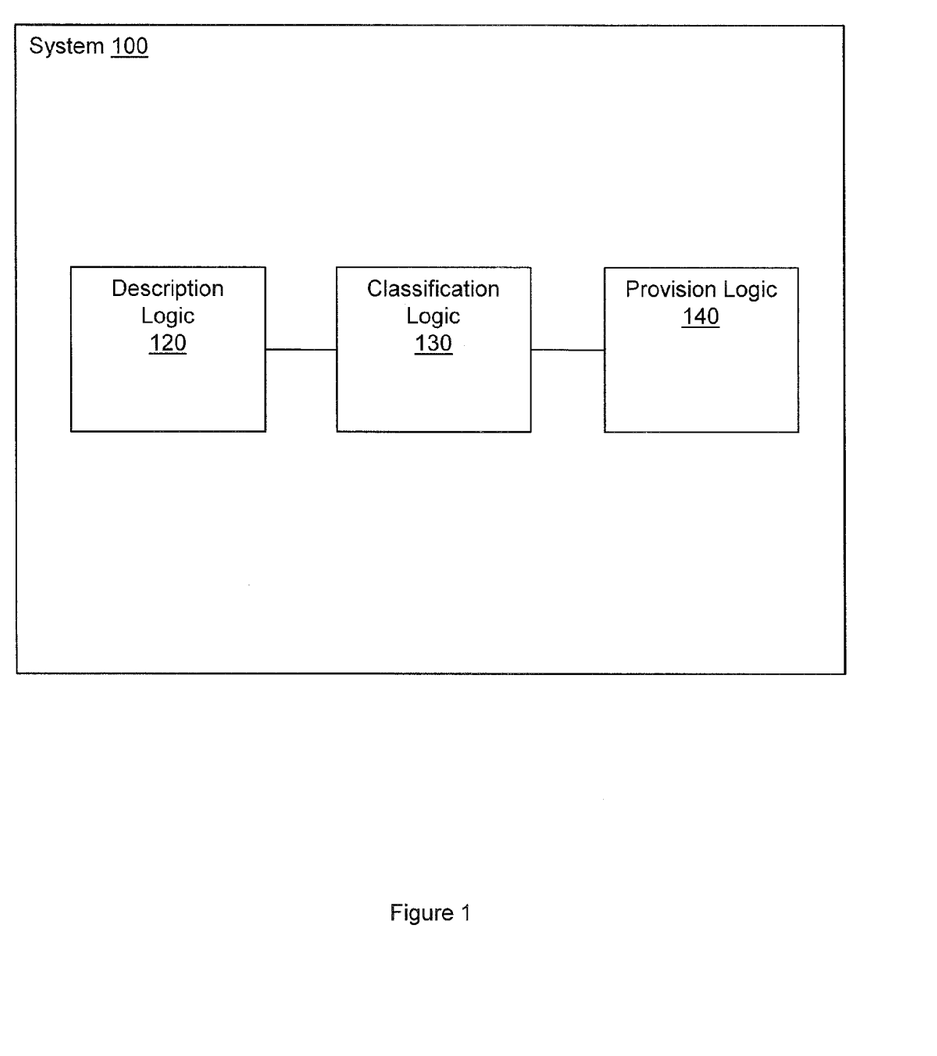
FIG. 1 illustrates an example embodiment of a system associated with GUI component classification.

FIG. 1 illustrates an example embodiment of a system 100 associated with graphical user interface (GUI) component classification. System 100 includes description logic 120. Description logic 120 may generate a first description of a GUI component. The description may be generated based on an image of the GUI component. In one example, the first description may be a first vector in a feature space. The first vector may comprise a first shape feature sub-vector, a first projection feature sub-vector, and a first shape context feature sub-vector. A shape feature sub-vector may describe a geometric shape of a GUI element. Thus, the first shape feature sub-vector may comprise data describing a width, a height, and an aspect ratio associated with the GUI component.

Generating a projection feature sub-vector may comprise computing a Laplacian of Gaussian (LoG) of an image I. $LoG(I)=\nabla G_\sigma \otimes I$, where G is a zero-mean Gaussian kernel with variance $\sigma$, and $\nabla$ is the Laplacian operator. By representing the image in the LoG space, color differences across different GUI elements may be removed allowing similar GUI elements with different color schemes to be more easily compared. Consider an m pixel by n pixel portion $O_i$ of an image I of a GUI component converted to the LoG space, m and n being integers. For the m by n portion $O_i$ of the image, the value of pixels along rows and columns may be projected to produce two object signatures, $S_{vert}$ and $S_{horiz}$. $S_{vert}$ may be computed according to:

$$S_{vert}(O_i) = \frac{1}{n}\sum_{y=1}^{n} LoG(I)(\text{row}, y)$$

where
row $\in r(O_i)$
$r(O_i)$ is the set of rows of pixels $O_i$ resides in.
LoG(I)(row,y) is a value associated with a pixel at (row,y) in the image of the GUI component converted to the LoG space.
$S_{horiz}$ may be computed according to:

$$S_{horiz}(O_i) = \frac{1}{m}\sum_{x=1}^{m} LoG(I)(x, col)$$

where
col $\in c(O_i)$
$c(O_i)$ is the set of columns of pixels $O_i$ resides in.
LoG(I)(x,col) is a value associated with a pixel at (x,col) in the image of the GUI component converted to the LoG space.

$S_{vert}(O_i)$ and/or $S_{horiz}(O_i)$ may then be used as a portion of the projection feature vector.

Generating a shape context feature sub-vector may comprise converting the image of the GUI component to a binary edge image. In one example, this may be zero-crossings of LoG(I). Vectors between edge points in the binary edge image may be computed. The vectors may be represented in a log-polar domain. A histogram of the vectors in the log-polar domain may be computed. The histogram may serve as a portion of the shape context feature sub-vector.

System 100 also includes classification logic 130. Classification logic 130 may assign a GUI component classifier to the GUI component. In one example, the GUI component classifier may be assigned as a function (e.g., nearest neighbor) of comparing the first description to members of a description set. In another example, members of the description set may be analyzed to generate a classification function. In this example, applying the classification function to the first description may facilitate assigning the GUI component classifier. A person having ordinary skill in the art will recognize that other classification techniques (e.g., neural networks, support vector machines) may be appropriate. Members of the description set may describe GUI elements that have been previously classified. Continuing with the above example, members of the description set may be vectors in the feature space. Thus, members of the description set may comprise a shape feature sub-vector, a projection feature sub-vector, and shape context feature sub-vector. System 100 also includes a provision logic 140. Provision logic 140 may provide the GUI component classifier. In one example, provision logic 140 may provide the GUI component classifier to a GUI hierarchy inference logic that infers relationships between groups of GUI components in a GUI. However, a person having ordinary skill in the art may recognize other logics that may benefit from knowing what type of GUI element is contained in an image of a GUI component.

By way of illustration, a content repurposing application may be configured to reorganize websites to fit on a mobile device. Upon receiving or generating images of content blocks of the website, the content repurposing application may then determine what elements are contained in the smaller content blocks. For example, the content repurposing application may want to attempt to keep a chart intact and relatively unchanged. However, the content repurposing application may able to separate and/or reorganize a series of rectangular buttons onto multiple lines. By comparing descriptions of chart portions and descriptions of rectangular buttons to a set of descriptions of known GUI elements, the content repurposing application may be able to distinguish between two similarly sized and shaped components.

Figure 2:
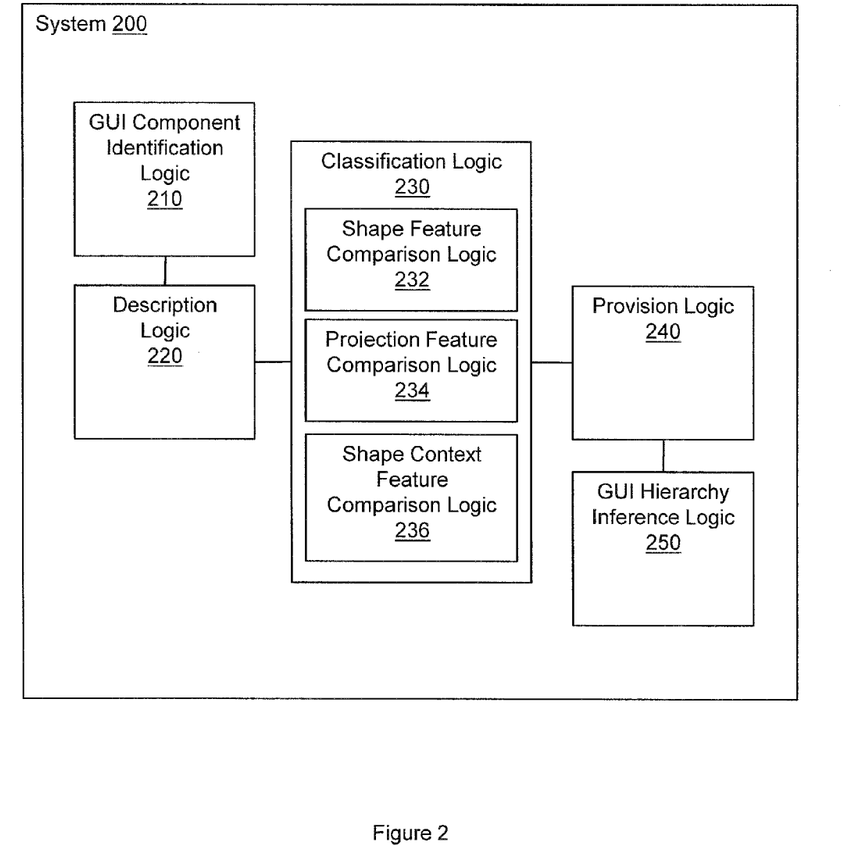
FIG. 2 illustrates an example embodiment of a system associated with GUI component classification.

FIG. 2 illustrates an example embodiment of a system 200 associated with GUI component classification. System 200 includes several items similar to those described in connection with system 100 (FIG. 1). For example, system 200 includes description logic 220 to generate a first description, classification logic 230 to assign a GUI component classifier, and provision logic 240 to provide the GUI component classifier. However, system 200 includes additional elements.

System 200 includes GUI component identification logic 210. GUI component identification logic 210 may identify a portion of an image of a GUI containing the image of the GUI component. GUI component identification logic 210 may also collect some information about the GUI component. For example, GUI component identification logic 210 may collect information regarding contents of the GUI component, information regarding neighbors of the GUI component, and so on. System 200 also includes GUI hierarchy inference logic 250. GUI Hierarchy inference logic 250 may generate a GUI hierarchy. In one example, provision logic 240 may provide the GUI component classifier to GUI hierarchy inference logic 250. Thus, the GUI hierarchy may be generated in part based on the GUI component classifier.

In FIG. 2, classification logic 230 contains three sub-logics. Classification logic 230 comprises shape feature comparison logic 232, projection feature comparison logic 234, and shape context feature comparison logic 236. Shape feature comparison logic 232 may generate a first subset of the description set. Shape feature comparison logic 232 may generate the first subset by comparing the first shape feature sub-vector to shape feature sub-vectors of members of the description set. In one example, shape feature comparison logic 232 may compute dimension differences between the first shape feature sub-vector and shape feature sub-vectors of members of the description set.

By way of illustration, shape feature comparison logic 232 may be configured to compare shape feature sub-vectors that describe a geometric shape of a GUI element. Consider a pair of GUI elements $O_i$ and $O_j$. An image of $O_i$ may be $n_i$ pixels by $m_i$ pixels and an image of $O_j$ may be $n_j$ pixels by $m_j$ pixels, where $n_i$, $m_i$, $n_j$ and $m_j$ are integers. The distance between dimensions of $O_i$ and $O_j$ ($M_1(O_i,O_j)$) may be computed by the formula:

$$M_1(O_i, O_j) = 1 - \frac{\min(m_i, m_j)}{\max(m_i, m_j)} \cdot \frac{\min(n_i, n_j)}{\max(n_i, n_j)}$$

After computing dimension distances between the first shape feature sub-vector and shape feature sub-vectors of members of the description set, shape feature comparison logic 232 may generate the first subset by selecting members of the vector set associated with $M_1(O_i,O_j)$ values above a first threshold. In one example, the first threshold may be a predefined value. In another example, the first threshold may be adjusted so that the first subset is a certain size.

Projection feature comparison logic 234 may generate a second subset of the description set. Projection feature comparison logic 234 may generate the second subset by comparing the first projection feature sub-vector to projection feature sub-vectors of members of the first subset. In one example, projection feature comparison logic 234 may compute edit differences between the first projection feature sub-vector and projection feature sub-vectors of members of the first subset.

By way of illustration, projection feature comparison logic 234 may be configured to compare projection feature sub-vectors. Consider a pair of projection feature sub-vectors $(S_{vert}(O_i), S_{horiz}(O_i))$ and $(S_{vert}(O_j), S_{horiz}(O_j))$. The edit distance ($M_2(O_i,O_j)$) between the two projection feature sub-vectors may include counting the minimum number of insertions and deletions needed to transform $(S_{vert}(O_i), S_{horiz}(O_i))$ into $(S_{vert}(O_j), S_{horiz}(O_j))$. Computing the edit distance in this manner may be robust with respect to scaling differences between GUI elements (e.g., two similar elements with different widths and/or heights). After computing edit distances between the first projection feature sub-vector and projection feature sub-vectors of members of the first subset, projection feature comparison logic 234 may generate the second subset by selecting members of the first subset associated with $M_2(O_i,O_i)$ values above a second threshold. In one example, the second threshold may be a predefined value. In another example, the second threshold may be adjusted so that the second subset is a certain size.

Shape context feature comparison logic 236 may generate a third subset of the description set. Shape context feature comparison logic 236 may generate the third subset by comparing the first shape context feature sub-vector to shape context feature sub-vectors of members of the second subset. Shape context feature comparison logic 236 may compute distances between a histogram generated based on the first shape context feature sub-vector and histograms generated based on shape context feature sub-vectors of members of the second subset. In one example, the third subset may contain a single member. This member may be used to classify the GUI component. However, a person having ordinary skill in the art will recognize that the third subset may contain more than one member, and further comparisons may be necessary to classify the GUI component.

By way of illustration, shape context feature comparison logic 236 may be configured to compare shape context feature sub-vectors comprising histograms. A person having ordinary skill in the art will recognize that there may be multiple ways to measure distances between histograms. For example, the $X^2$ distance between histograms h and h' on I bins is defined to be:

$$\frac{1}{2}\sum_{k=1}^{l}\frac{[h(k)-h'(k)]^2}{h(k)+h'(k)}$$

In one example, the first shape context feature sub-vector and shape context feature sub-vectors of members of the description set may comprise multiple histograms. In this example, shape context feature comparison logic 236 may compute distances between histograms in the first shape context feature sub-vector and histograms in a shape context feature sub-vector of a member of the description set. Shape context feature comparison logic 236 may be configured to define the distance $M_3(O_i, O_j)$ between the first shape context feature sub-vector and the shape context feature sub-vector of the member of the description set as the minimum of the distances computed. Shape context feature comparison logic 236 may then generate the third subset by selecting members of second subset associated with $M_3(O_i, O_j)$ values above a third threshold. In one example, the third threshold may be a predefined value. In another example, the third threshold may be adjusted so that the third subset is a certain size.

By employing a cascading approach, execution time may be saved. Additionally, by weighting certain features in certain steps, more accurate classification may be achieved. Furthermore, weighting certain features of the feature vector may normalize contributions of portions of sub-vectors. Computing dimension distances may be an example of a relatively low execution time cost when compared to computing edit distances and computing distances between histograms. Computing distances between histograms may have a relatively high execution time cost. Reducing the number of comparisons made using high execution time cost techniques by eliminating unlikely matches with faster techniques may speed up classification. A GUI that has had components classified may then be examined to generate a GUI hierarchy to describe how GUI components are related. A GUI hierarchy may facilitate observing, manipulating, repurposing, and/or summarizing an application associated with the GUI.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 3:
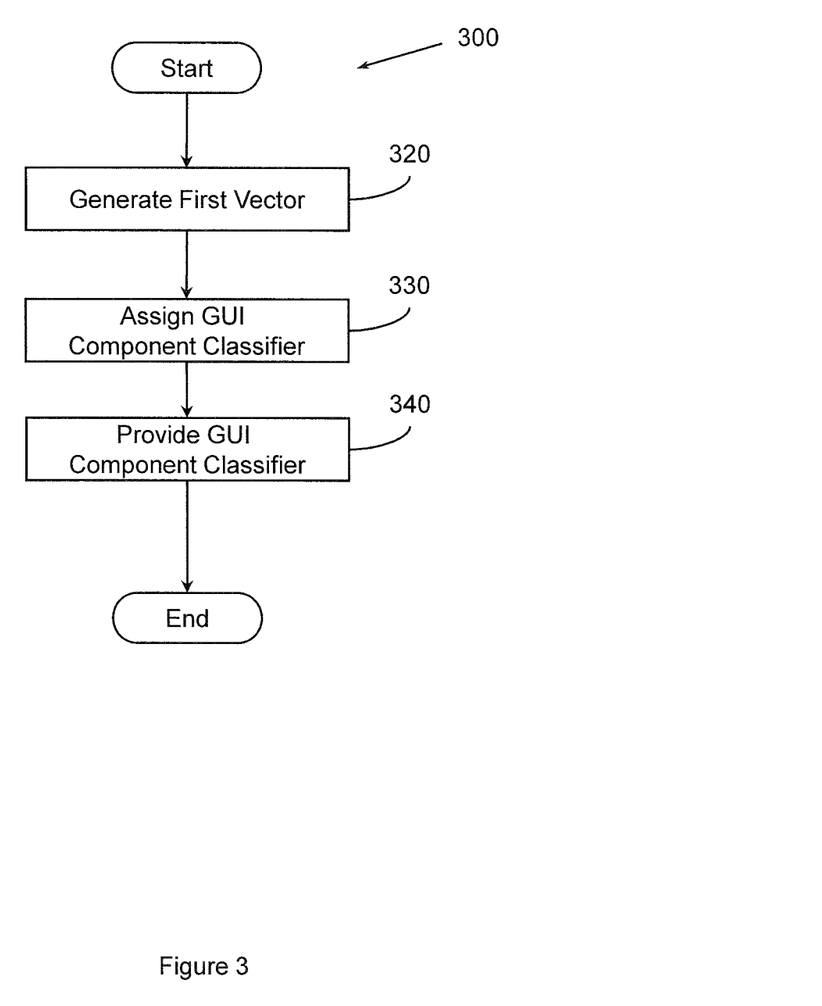
FIG. 3 illustrates an example embodiment of a method associated with GUI component classification.

FIG. 3 illustrates an example embodiment of a method 300 associated with graphical user interface (GUI) component classification. Method 300 includes, at 320, generating a first vector. The first vector may be generated based on image data describing a GUI component. The first vector may comprise a shape feature sub-vector, a projection feature sub-vector, and a shape context feature sub-vector. The first vector may also be generated based on contextual data. Contextual data may comprise hierarchy data, data from a document object model (DOM), data generated from user input, and so on.

Method 300 also includes, at 330, assigning a GUI component classifier to the GUI component. The GUI component classifier may be assigned as a function of comparing the first vector to members of a vector set. Members of the vector set may describe GUI elements. Comparing the first vector to members of the vector set may comprise performing a nearest neighbor comparison between the first vector and members of the vector set. This may identify members of the vector set that are similar to the first vector, and thus, GUI elements that are similar to the GUI component.

In one example, assigning the GUI component classifier to the GUI component may comprise computing a first distance value set. A member of the first distance value set may be computed by determining a distance between a first portion of the first vector and a portion of a member of the vector set. The first portion of the first vector may be associated with the shape feature sub-vector. The portion of the member of the vector set may correspond to the first portion of the first vector. Thus, determining the distance between the first vector and the member of the vector set may comprise determining a dimension distance between the first portion of the first vector and the portion of the member of the vector set. Assigning the GUI component classifier may also comprise generating a first vector subset of the vector set. The first vector subset may be generated by selecting members of the vector set that are associated with members of the first distance value set that meet a first threshold distance value.

Assigning the GUI component classifier to the GUI component may also comprise computing a second distance value set. A member of the second distance value set may be computed by determining a distance value between a second portion of the first vector and a portion of a member of the first vector subset. The second portion of the first vector may be associated with the projection feature sub-vector. The portion of the member of the first vector subset may correspond to the second portion of the first vector. Thus, determining a distance between the first vector and the member of the first vector subset may comprise determining an edit distance between the second portion of the first vector and the portion of the member of the first vector subset. Assigning the GUI component classifier to the GUI component may also comprise generating a second vector subset of the vector set. The second vector subset may be generated by selecting members of the first vector subset that are associated with members of the second distance value set that meet a second threshold distance value.

Assigning the GUI component classifier to the GUI component may also comprise computing a third distance value set. A member of the third distance value set may be computed by determining a distance between a third portion of the first vector and a portion of a member of the second vector subset. The third portion of the first vector may be associated with the shape context feature sub-vector. The portion of the member of the second vector subset may correspond to the third portion of the first vector. Thus, determining the distance between the first vector and the member of the second vector subset may comprise determining distances between histograms in the third portion of the first vector and histograms in the portion of the member of the second vector subset. Assigning the GUI component classifier to the GUI component may also comprise generating a third vector subset of the vector set. The third vector subset may be generated by selecting members of the second vector subset that are associated with members of the third distance value set that meet a third threshold distance value. In one example, the third vector subset may comprise a single vector. However, a person having ordinary skill in the art may recognize classification techniques using a greater or lesser number of comparisons.

Method 300 also includes, at 340, providing the GUI component classifier. The GUI component classifier may be provided to a data store, a content repurposing application, a windows command and control application, a software testing application, a help application, GUI hierarchy inference logic, an application monitory system, an accessibility application, a search engine, and so on.

While FIG. 3 illustrates various actions occurring in serial, it is to be appreciated that various actions illustrated in FIG. 3 could occur substantially in parallel. By way of illustration, a first process could generate a first vector, a second process could assign a GUI component classifier, and a third process could provide the GUI component classifier. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform method 300. While executable instructions associated with the above method are described as being stored on a computer-readable medium, it is to be appreciated that executable instructions associated with other example methods described herein may also be stored on a computer-readable medium.

Figure 4:
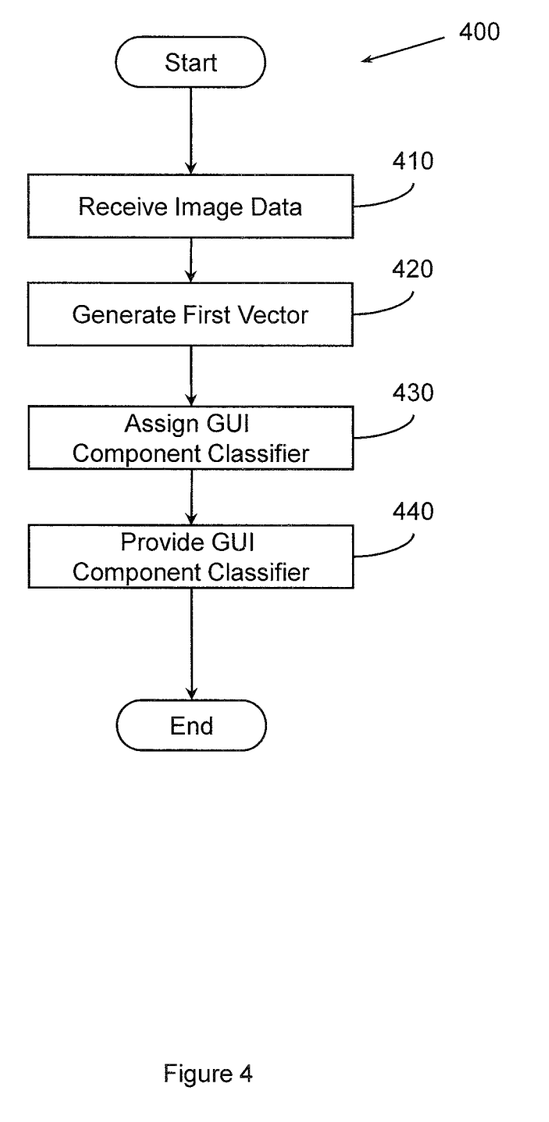
FIG. 4 illustrates an example embodiment of a method associated with GUI component classification.

FIG. 4 illustrates an example embodiment of a method 400 associated with GUI component classification. Method 400 includes several actions similar to those described in connection with method 300 (FIG. 3). For example, method 400 includes generating a first vector at 420, assigning a GUI component classifier at 430, and providing the GUI component classifier at 440. However, method 400 includes an additional action. Method 400 includes, at 410, receiving the image data describing the GUI component. The image data may be received from a GUI component identification logic. Additional data may also be received from the GUI component identification logic. The additional data may include data describing the GUI component, data describing GUI components near the GUI component, and so on. In one example, assigning a GUI component classifier may be based on the additional data.

Figure 5:
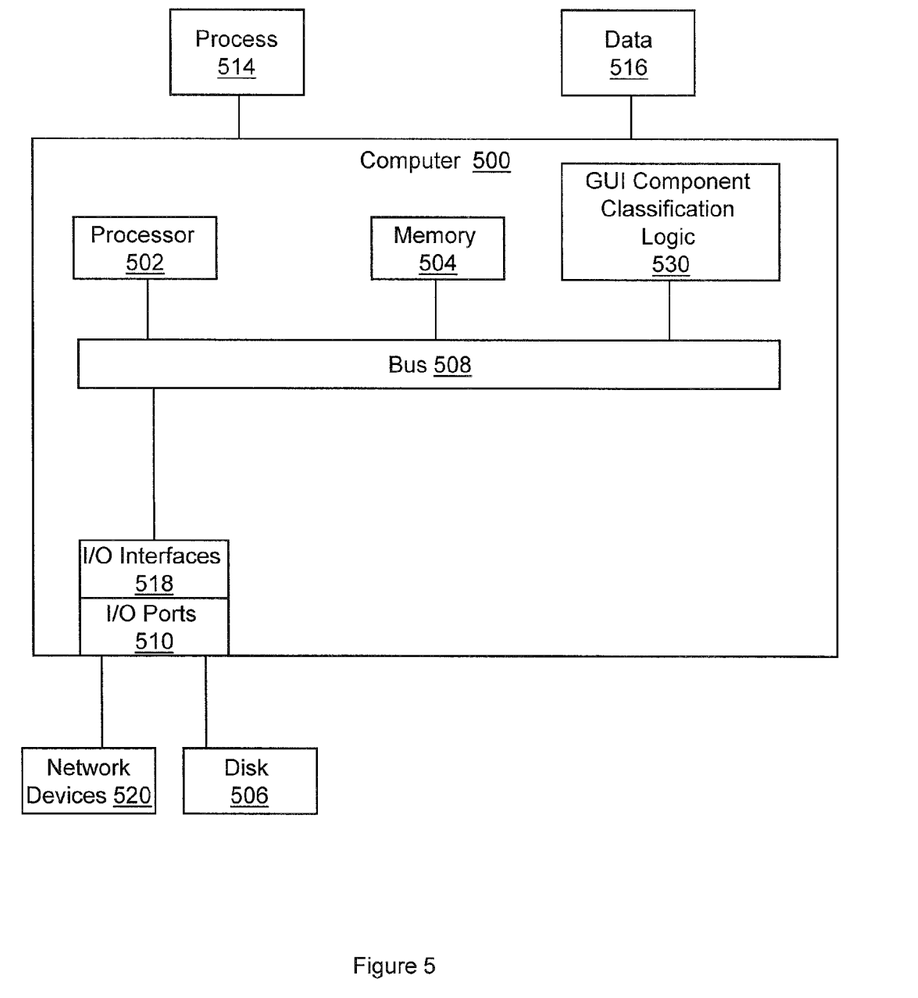
FIG. 5 illustrates an example embodiment of a computing environment in which example systems and methods, and equivalents, may operate.

FIG. 5 illustrates an example embodiment of a computing device in which example systems and methods described herein, and equivalents, may operate. The example computing device may be a computer 500 that includes a processor 502, a memory 504, and input/output ports 510 operably connected by a bus 508. In one example, the computer 500 may include a GUI component classification logic 530. In different examples, the logic 530 may be implemented in hardware, software, firmware, and/or combinations thereof. While the logic 530 is illustrated as a hardware component attached to the bus 508, it is to be appreciated that in one example, the logic 530 could be implemented in the processor 502.

GUI component classification logic 530 may provide means (e.g., hardware, software, firmware) for generating a vector describing a graphical user interface (GUI) component. The vector may be generated based on an image of the GUI component. The means may be implemented, for example, as an ASIC. The means may also be implemented as computer executable instructions that are presented to computer 500 as data 516 that are temporarily stored in memory 504 and then executed by processor 502. GUI component classification logic 530 may also provide means (e.g., hardware, computer-readable medium with stored software, firmware) for automatically assigning a label to the GUI component based on the vector. GUI component classification logic 530 may also provide means (e.g., hardware, computer-readable medium with stored software, firmware) for providing the label.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, comprising:
a processor;
description logic to direct the processor to generate a first description of a graphical user interface (GUI) component based on an image of the GUI component;
classification logic to direct the processor to assign a GUI component classifier to the GUI component as a function of comparing a first feature sub-vector of the first description to the first feature sub-vectors of members of a description set to generate a first subset of the description set and comparing a second feature sub-vector of the first description to the second feature sub-vectors of the first subset to generate a second subset of the description set, where members of the description set describe pre-classified GUI elements; and
provision logic to direct the processor to provide the GUI component classifier.

2. The system of claim 1, where the first description is a first vector in a feature space, where the first vector comprises a first shape feature sub-vector, a first projection feature sub-vector, and a first shape context feature sub-vector, where members of the description set are vectors in the feature space, and where members of the description set comprise a shape feature sub-vector, a projection feature sub-vector, and a shape context feature sub-vector.

3. The system of claim 2, where the classification logic assigns the GUI component classifier by identifying a member of the description set that is a nearest neighbor to the first description.

4. The system of claim 2, where the classification logic comprises:
shape feature comparison logic to compare the first shape feature sub-vector to shape feature sub-vectors of members of the description set to generate a shape feature subset of the description set;
projection feature comparison logic to compare the first projection feature sub-vector to projection feature sub-vectors of members of the shape feature subset to generate a projection feature subset of the description set; and
a shape context feature comparison logic to compare the first shape context feature sub-vector to shape context feature sub-vectors of members of the projection feature subset to generate a shape context subset of the description set.

5. The system of claim 4,
where the shape feature comparison logic computes dimension differences between the first shape feature sub-vector and shape feature sub-vectors of members of the description set,
where the projection feature comparison logic computes edit differences between the first projection feature sub-vector and projection feature sub-vectors of members of the shape feature subset, and
where the shape context feature comparison logic computes distances between a histogram generated based on the first shape context feature sub-vector and histograms generated based on shape context feature sub-vectors of members of the projection feature subset.

6. The system of claim 1, comprising:
GUI component identification logic to direct the processor to generate the image of the GUI component.

7. The system of claim 1, comprising:
GUI hierarchy inference logic to direct the processor to generate a GUI hierarchy based, at least in part, on the GUI component classifier.

8. A tangible, non-transitory computer-readable medium storing computer-executable instructions that when executed by a computer cause the computer to perform a method, the method comprising:
generating a first vector based on image data describing a graphical user interface (GUI) component;
assigning a GUI component classifier to the GUI component as a function of comparing the first vector to members of a vector set, where members of the vector set describe GUI elements;
generating a first vector subset of the vector set by selecting members of the vector set that are associated with members of a first distance value set computed by determining a distance between a first portion of the first vector and a portion of a member of the vector set that meet a first threshold distance value;
generating a second vector subset of the vector set by selecting members of the first vector subset that are associated with members of the second distance value set computed by determining a distance between a second portion of the first vector and a portion of a member of the first vector subset that meet a second threshold distance value; and
providing the GUI component classifier.

9. The tangible, non-transitory computer-readable medium of claim 8, the method comprising:
receiving the image data describing the GUI component from a GUI component identification logic.

10. The tangible, non-transitory computer-readable medium of claim 8, where the GUI component classifier is provided to one or more of, a data store, a content repurposing application, a windows command and control application, a software testing application, a help application, a GUI hierarchy inference logic, an application monitoring system, a search engine, and an accessibility application.

11. The tangible, non-transitory computer-readable medium of claim 8, where comparing the first vector to members of the vector set comprises performing a nearest neighbor comparison between the first vector and members of the vector set.

12. The tangible, non-transitory computer-readable medium of claim 8, where comparing the first vector to members of the vector set comprises generating a classification function based on the vector set and applying the function to the first vector.

13. The tangible, non-transitory computer-readable medium of claim 8, where comparing the first vector to members of the vector set comprises using one or more of, a neural network and a support vector machine.

14. The tangible, non-transitory computer-readable medium of claim 8,
wherein the portion of the member of the vector set corresponds to the first portion of the first vector.

15. The tangible, non-transitory computer-readable medium of claim 14,
wherein the portion of the member of the first vector subset corresponds to the second portion of the first vector.

16. The tangible, non-transitory computer-readable medium of claim 15, where assigning the GUI component classifier to the GUI component comprises:
computing a third distance value set, where a member of the third distance value set is computed by determining a distance between a third portion of the first vector and a portion of a member of the second vector subset, where the portion of the member of the second vector subset corresponds to the third portion of the first vector; and
generating a third vector subset of the vector set by selecting members of the second vector subset that are associated with members of the third distance value set that meet a third threshold distance value.

17. The tangible, non-transitory computer-readable medium of claim 16, where the first vector comprises a shape feature sub-vector, a projection feature sub-vector, and a shape context feature sub-vector, where the first portion of the first vector is associated with the shape feature sub-vector, where the second portion of the first vector is associated with the projection feature sub-vector, and where the third portion of the of the first vector is associated with the shape context feature sub-vector.

18. The tangible, non-transitory computer-readable medium of claim 8, where generating the first vector is also based on contextual data.

19. The tangible, non-transitory computer-readable medium of claim 18, where the contextual data comprises one or more of hierarchy data, data from a document object model (DOM), and data generated from user input.

20. A system, comprising:
means for generating a vector describing a graphical user interface (GUI) component based on an image of the GUI component;
means for assigning a label to the GUI component as a function of comparing a first feature of the vector to the first feature of members of a vector set to generate a first feature subset and comparing a second feature of the vector to the second feature of members of the first feature subset to generate a second feature subset, where members of the vector set describe GUI elements; and
means for providing the label.

* * * * *

UNITED STATES PATENT AND TRADEMARK OFFICE
CERTIFICATE OF CORRECTION

PATENT NO. : 9,104,450 B2  
APPLICATION NO. : 12/605418  
DATED : August 11, 2015  
INVENTOR(S) : Sagi Schein et al.

Page 1 of 1

It is certified that error appears in the above-identified patent and that said Letters Patent is hereby corrected as shown below:

ON THE TITLE PAGE

In (56) References Cited, OTHER PUBLICATIONS, Page 2, line 1, delete "El-Naga" and insert -- El-Naqa --, therefor.

In (56) References Cited, OTHER PUBLICATIONS, Page 2, line 3, delete "Trasnactions" and insert -- Transactions --, therefor.

IN THE CLAIMS

In column 14, line 2, in Claim 17, delete "of the of the" and insert -- of the --, therefor.

Signed and Sealed this  
First Day of March, 2016

Michelle K. Lee  
*Director of the United States Patent and Trademark Office*